United States Patent [19]

Mori et al.

[11] 4,170,582

[45] Oct. 9, 1979

[54] PROCESS FOR PREPARING A POLYMER RESIN AQUEOUS DISPERSION

[75] Inventors: Kaoru Mori, Izumi; Hiro Tanaka, Sakai; Hirosi Ozawa, Izumi-ohtsu; Yoichi Murakami, Sennan, all of Japan

[73] Assignee: Dainippon Ink and Chemicals, Inc., Tokyo, Japan

[21] Appl. No.: 819,933

[22] Filed: Jul. 28, 1977

[30] Foreign Application Priority Data

Aug. 3, 1976 [JP] Japan .................................. 51/92051

[51] Int. Cl.$^2$ .............................................. C08L 33/06
[52] U.S. Cl. .................. 260/29.6 RW; 260/29.4 UA; 260/29.6 H; 260/29.6 TA; 260/29.7 W; 260/29.7 UP; 526/273; 526/303; 526/321; 526/320; 526/323.2
[58] Field of Search ................. 260/29.6 H, 29.6 TA, 260/29.6 RW, 29.7 W, 29.7 UP

[56] References Cited

U.S. PATENT DOCUMENTS

| | | | |
|---|---|---|---|
| 3,896,070 | 7/1975 | Fummler et al. | 260/29.6 TA |
| 3,976,614 | 8/1976 | Elms et al. | 260/29.6 TA |
| 4,045,399 | 8/1977 | Suzuki et al. | 260/29.6 TA |
| 4,049,607 | 9/1977 | Berghoff | 260/29.6 TA |

*Primary Examiner*—Harold D. Anderson
*Attorney, Agent, or Firm*—Sherman & Shalloway

[57] ABSTRACT

A process for producing a resin dispersion characterized in that an ethylenically unsaturated monomer capable of forming a polymer insoluble in an aqueous medium is polymerized in a solution formed by dissolving in said aqueous medium a water-soluble polymer derived from (1) 10–90% by weight of a hydroxyalkyl (meth-)acrylate expressed by the following general formula

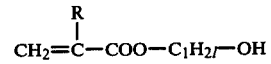

wherein R is a hydrogen atom or a methyl group, and l is an integer of 2, 3 or 4, (2) 10–90% by weight of a polyalkyleneglycol mono (meth-)acrylate expressed by the following general formula

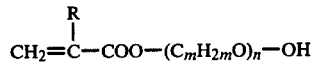

wherein R is a hydrogen atom or a methyl group, m is an integer of 2 or 3, and n is an integer of 2 to 20, and (3) 0–30% by weight of another ethylenically unsaturated monomer.

12 Claims, No Drawings

PROCESS FOR PREPARING A POLYMER RESIN AQUEOUS DISPERSION

This invention relates to a resin dispersion for a paint in which a polymer is dispersed in an aqueous medium. The term "aqueous medium" used herein designates water alone or a mixture of water and a water-soluble organic solvent.

It is well known that the dispersion polymerization of an ethylenically unsaturated monomer capable of forming a water-insoluble polymer using an ordinary emulsifier or a protective colloid agent as a dispersant provides a resin dispersion in which a polymer is dispersed in water. Though the resulting composition has gained acceptance for application for a paint, it has poor stability and in addition, its cured coating has low water resistance on account of the nature of the dispersant used for the polymerization.

To cope with this problem, a process has been proposed which uses a water-soluble polymer obtained by polymerizing a hydroxyalkyl (meth-)acrylate as a dispersant (Japanese Patent Publication No. 41457/71). According to this process, however, it is not possible to increase non-volatile components of the resulting resin dispersion up to about 50% by weight because the polymer used as the dispersant has low water-solubility, resulting thereby in the formation of a coagulated precipitate during the reaction. Hence, the process provides only such a resin dispersion having at most about 25% by weight of the non-volatile components. In addition, this resin dispersion of a low solid content has inferior stability and can not be optionally diluted with water.

On the other hand, there was also been proposed a process for elevating the non-volatile components of the polymer up to about 50% by weight by forming the abovementioned resin dispersion in the presence of a specific solvent (Japanese Patent Publication No. 41472/71). However, this process results in an extremely high viscosity of the resulting polymer, e.g., several ten thousands centipoises, and leaves other problems yet to be solved.

It is therefore a primary object of the present invention to provide a high solid resin dispersion having a low viscosity.

It is another object of the invention to provide a resin dispersion having good mechanical stability as well as good storage stability which can be optionally diluted with water.

It is still another object of the invention to provide a resin dispersion which, when admixed with a curing agent, forms an excellent cured coating.

These and other objects of the invention will become more apparent from the following detailed description thereof.

In order to accomplish the abovementioned objects, the inventors of this invention have made intensive studies. As a result, the inventors have now found that the problems with the conventional processes can be overcome by use of, as a dispersant, a water-soluble polymer obtained by the polymerization of a hydroxyalkyl (meth-)acrylate and a polyalkyleneglycol mono(meth-)acrylate irrespective of whether the dispersion medium is water alone or a mixture of water and a water-soluble organic solvent.

In accordance with the present invention, therefore, there is produced a resin dispersion satisfying the aforementioned objects of this invention by polymerizing an ethylenically unsaturated monomer capable of forming a polymer insoluble in an aqueous medium in a solution obtained by dissolving in said aqueous medium a water-soluble polymer derived from (1) 10–90% by weight of a hydroxyalkyl (meth-)acrylate expressed by the general formula I

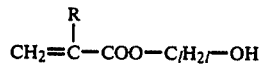

wherein R is a hydrogen atom or a methyl group, and l is an integer of from 2 to 4, (2) 10–90% by weight of a polyalkyleneglycol mono(meth-)acrylate expressed by the general formula II

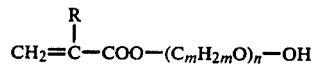

wherein R is a hydrogen atom or a methyl group, m is an integer of 2 or 3, and n is an integer of from 2 to 20, and (3) 0–30% by weight of another ethylenically unsaturated monomer.

The resin dispersion of the present invention has an amazingly high solid content and has a low viscosity. It has excellent stability and can be optionally diluted with water. These surprising effects are accomplished by the use of only a specific water-soluble polymer as a dispersant but never by the use of other dispersants.

The water-soluble polymer to be used in the present invention is soluble in an aqueous medium used for the contemplated resin dispersion of the invention and functions as a dispersant and at the same time, as a film-forming component in combination with the resulting polymer. The number average molecular weight of the water-soluble polymer (by gel permeation chromatography) generally ranges from 1,000 to 100,000, preferably from 2,000 to 20,000. As to water-solubility of this polymer, a 50 wt.% solution of the polymer in the aqueous medium has generally a water tolerance (at 25° C.) of at least 500%, preferably 1,000% or more.

If the water-soluble polymer has an ethylenically unsaturated bond at its side chain, the graft polymerization reaction of an ethylenically unsaturated monomer takes place positively with the unsaturated bond as an active site, and a greater amount of the graft polymer is formed between the water-soluble polymer and the resulting polymer, thereby affording a resin dispersion having improved mechanical stability and storage stability. Such a water-soluble polymer also provides a coating having more improved properties and hence, is specifically advantageous.

The water-soluble polymer is composed of the components (1), (2) and (3). The first component (1) is a hydroxyalky (meth-)acrylate expressed by the aforementioned general formula I. Though 2-hydroxyethyl (meth-)acrylate is most preferred, other (meth-)acrylates such as 2-hydroxypropyl (meth-)acrylate and 2-hydroxy-n-butyl (meth-)acrylate are also used suitably. The proportion of the first component in the water-soluble polymer is from 10 to 90% by weight, preferably from 30 to 70% by weight.

The second component (2) is a polyalkyleneglycol mono(meth-)acrylate expressed by the aforementioned general formula II. Preferred examples are polyethyleneglycol mono(meth-)acrylates such as diethyleneglycol mono(meth-)acrylate, triethyleneglycol mono(meth-)acrylate, and pentaethyleneglycol mono(meth-)acrylate. Polypropyleneglycol mono(methy-)acrylates such as dipropyleneglycol mono(meth-)acrylate, tripropyleneglycol mono(meth-)acrylate, pentapropyleneglycol mono(meth-)acrylate and the like may also be used suitably, in addition to the abovementioned polyethyleneglycol mono(meth-)acrylates. The proportion of the second component in the water-soluble polymer is from 10 to 90% by weight, preferably from 30 to 70% by weight.

The third component (3) is an ethylenically unsaturated monomer which is used, if necessary. There are two types for the third component, one being a monoene having one ethylenically unsaturated bond, and the other being a polyene having two or more ethylenically unsaturated bonds.

Specific examples of the monoene are methyl (meth-)acrylate, ethyl (meth-)acrylate, propyl (meth-)acrylate, butyl (meth-)acrylate, diethyl maleate, dibutyl fumarate, diethyl itaconate, styrene, vinyl toluene, (meth-)acrylamide, N-methylol (meth-)acrylamide, glycidyl (meth-)acrylate, (meth-)acrylic acid, maleic acid, fumaric acid, itaconic acid, and the like.

The polyene is a monomer which is used for introducing an ethylenically unsaturated bond into the side chain of the water-soluble polymer. Most preferred is an ester formed between one mole of a polymerizable carboxylic acid such as (meth-)acrylic acid and 1 mole of glycidyl (meth-)acrylate. It is possible to use other compounds, e.g., an ester of 1 mole of a polyhydric alcohol such as ethyleneglycol and at least 2 moles of (meth-)acrylic acid, an adduct of at least 2 moles of a hydroxyalkyl (meth-)acrylate such as 2-hydroxyethyl (meth-)acrylate and 1 mole of a polyisocyanate such as hexamethylene diisocyanate; butadiene and isoprene.

When the ester or the adduct is used, it is preferred to incorporate in advance one of the starting compounds forming the ester or the adduct into the water-soluble polymer, and then to allow it to react with the other starting compound so that an ethylenically unsaturated bond is finally introduced into the polymer. The total proportion of the third component in the water-soluble polymer is at most 30% by weight, preferably not more than 20% by weight. The proportion of the monomer for introducing the ethylenically unsaturated bond is generally from 0.05 to 15% by weight, preferably from 0.2 to 10% by weight.

The water-soluble polymer is obtained by polymerizing these monomers (1), (2) and (3) in accordance with the known solution polymerization method. A water-soluble organic solvent or an aqueous medium may be used as a solvent for the polymerization. The polymerization is preferably performed at a temperature of 200° C. or below for 1 to 30 hours, preferably for about 2 to about 15 hours. Examples of polymerization initiators are oil-soluble or water-soluble initiators such as azobisisobutyronitrile, benzoyl peroxide, di-tert.butyl peroxide, cumene hydroperoxide, hydrogen peroxide and ammonium persulfate. The suitable amount of the polymerization initiator is from about 0.1 to about 10% by weight on the basis of the total amount of the monomers used. It is also possible to adjust the molecular weight of the resulting polymer by adding to the polymerization system during the polymerization such a compound as n-octyl mercaptan, n-dodecyl mercaptan, thioglycollic acid, 2-ethylhexyl, thioglycolate, allyl alcohol, methyl methacrylate dimer, or α-methylstyrene dimer.

Examples of the water-soluble organic solvent to be used in the present invention are those organic solvents which are optionally miscible with water at normal temperature such as methanol, ethanol, n-propanol, iso-propanol, tert-butanol, Cellosolve, methyl Cellosolve, butyl Cellosolve, methoxy butanol, carbitol, methyl carbitol, acetone, dioxane, methyl Cellosolve acetate, carbitol acetate and diacetone alcohol, and those organic solvents which are miscible with water to a certain extent at normal temperature such as n-butanol, iso-butanol, sec-butanol, methyl ethyl ketone, methyl acetate, ethyl acetate, and Cellosolve acetate.

As noted in the preceding paragraph, in accordance with the present invntion, an ethylenically unsaturated monomer is subjected to dispersion polymerization in a solution of the resulting water-soluble polymer in an aqueous medium. In this instance, the aqueous medium must be so selected as to meet the requirements that the polymer in the contemplated resin dispersion must not be dissolved therein. A suitable composition of the aqueous medium consists of 100 parts by weight of water and 0 to 400 parts by weight of the above-mentioned water-soluble organic solvent. The amount of the aqueous medium used is selected in such a range that the solid content in the resulting resin dispersion is generally at most 70% by weight, preferably from 40 to 60% by weight. The amount of the ethylenically unsaturated monomer used is generally from 100 to 20,000 parts by weight, preferably from 150 to 3,000 parts by weight, per 100 parts by weight of the solid content of the water-soluble polymer.

The ethylenically unsaturated monomer to be used in the present invention forms a polymer which is insoluble in the aqueous medium of the contemplated resin dispersion. The term "insoluble" used herein means that polymers of a molecular weight exceeding the intended molecular weight (average) are not soluble in the aqueous medium at the polymerization temperature. Hence, the term does not mean that polymers of a molecular weight lower than the intended molecular weight (average) by-produced inevitably during the polymerization reaction are insoluble in the aqueous medium.

Specific examples of such monomers include methyl (meth-)acrylate, ethyl (meth-)acrylate, propyl (meth-)acrylate, butyl (meth-)acrylate, 2-ethylhexyl (meth-)acrylate, lauryl (meth-)acrylate, benzyl (meth-)acrylate, cyclohexyl (meth-)acrylate, diethyl maleate, dibutyl maleate, diethyl fumarate, dibutyl fumarate, diethyl itaconate, dibutyl itaconate, (meth-)acrylonitrile, vinyl acetate, vinyl chloride, vinylidene chloride, styrene, vinyl toluene, α-methylstyrene, 2-hydroxyethyl (meth-)acrylate, 2-hydroxypropyl (meth-)acrylate, N-methylol methacrylamide, glycidyl (meth-)acrylate, (meth-)acrylic acid, maleic acid, fumaric acid, itaconic acid, and the like.

In polymerizing these monomers, it is advantageous to partially use a monomer having a functional group such as hydroxyl group, a carboxyl group or a glycidyl group, because the resulting polymer has such a functional group and thus can be cured with a curing agent that is reactive with the functional group. The hydroxyl group is most preferred as the functional group to be introduced. For, since the hydroxyl group is the same as the essential functional group of the water-soluble polymer as the dispersant, both water-soluble polymer and resulting polymer can be integrally cured with a hydroxy-reactive curing agent. In this instance, a small amount of a carboxy-containing monomer may be conjointly used as an internal catalyst. The amount used of the monomers having a functional group is preferably from 3 to 50% by weight, more preferably from 5 to 30% by weight, based on the total amount of all the monomers.

In order to carry out the polymerization reaction for producing the resin dispersion, no specific means and methods are particularly required in the invention. Namely, since the dispersion polymerization is effected till the intended degree of polymerization is attained, the polymerization may as well be performed at a temperature of 150° C. or below for 1 to 30 hours, preferably for about 2 to about 15 hours. The aforementioned polymerization initiators may also be used. It is also possible to use a redox-type catalyst. Furthermore, the aforementioned molecular weight adjuster may be similarly used.

Since the water-soluble polymer as the dispersant has extremely high water-solubility, the resin dispersion obtained in this manner can be diluted with water to an optional degree. Even when the aqueous medium is composed of water alone, it is possible to obtain stably a resin dispersion composition having a solid concentration of as high as 40 to 60% and a low viscosity of only several hundred centipoises.

In order to modify the resin dispersion, it is possible to properly blend, if necessary, a known resin, either dissolved or dispersed in the aqueous medium and water-solubilized with amines, ammonia, etc., such as an alkyd resin, an acrylic resin, an emulsion resin, and the like.

By combining the resin dispersion with a curing agent which is reactive with the functional group of the polymer, it is possible to obtain a cured coating having excellent properties, especially excellent hardness, flexibility, transparency, water-resistance, solvent-resistance, etc., after drying at normal temperature or baking of the coating. As the curing agent to be combined, most preferred are hydroxy-reactive curing agents such as an amino resin, a blocked polyisocyanate, and the like. Examples of the amino resin are those condensates which are obtained by reacting at least one amino compound, e.g., melamine, urea, benzoguanamine, etc. with formaldehyde, and those etherified products obtained by reacting the abovementioned condensate with a lower alcohol. Examples of the blocked polyisocyanate are those compounds which are obtained by subjecting to the addition reaction a diisocyanate, e.g. toluene diisocyanate, xylylene diisocyanate, hexamethylene diisocyanate, etc. and a polyhydric alcohol, e.g. glycerine, trimethylol propane, pentaerythritol, etc. and blocking the isocyanate group of the resulting added polyisocyanate with a blocking agent such as phenol, oxime, methanol and the like.

In addition, it is possible to use a known carboxyl-reactive curing agent such as an epoxy resin and a known glycidyl-reactive curing agent such as a carboxyl-containing polyester resin. The suitable amount of the curing agent is from 5 to 100 parts by weight, preferably from 10 to 70 parts by weight, per 100 parts by weight of the solid content of the resin dispersion, though it varies in accordance with the type of the curing agent.

The present invention will be further explained with reference to the following examples in which "part" and "%" are based on weight.

EXAMPLE 1

A reactor equipped with a thermometer, a stirrer, a nitrogen gas feed pipe and a reflux condenser was charged with 800 parts of butyl Cellosolve and 5 parts of tert-butyl peroxybenzoate, and heated to 120° C. Next, 490 parts of diethyleneglycol monomethacrylate, 490 parts of 2-hydroxyethyl methacrylate, 20 parts of acrylic acid, 200 parts of butyl Cellosolve and 10 parts of benzoyl peroxide were charged into the reactor over a period of 3 hours, and maintained at 120° C. for an additional 2 hours. After 5 parts of glycidyl methacrylate, 0.5 part of dimethyl laurylamine and 0.5 part of hydroquinone were added, the mixture was further maintained at 120° C. for 5 hours. There was thus obtained a solution of a water-soluble polymer A, which had a number average molecular weight of 8,500 and a water tolerance of greater than 1,000%.

A similar reactor was charged with 400 parts of the water-soluble polymer solution A and 600 parts of water, and heated to 80° C., to which were added 360 parts of methyl methacrylate, 360 parts of ethyl acrylate, 80 parts of 2-hydroxyethyl methacrylate, 200 parts of water and 8 parts of ammonium persulfate in the course of 2 hours, and further maintained at 80° C. for 4 hours. There was thus obtained a milky white resin dispersion having a non-volatile content of 51.0% and a viscosity of 800 cps.

EXAMPLE 2

The same reactor as used in Example 1 was charged with 600 parts of the water-soluble polymer solution A and 500 parts of water and heated to 80° C., to which 315 parts of styrene, 315 parts of n-butyl acrylate, 70 parts of 2-hydroxyethyl methacrylate, 200 parts of water and 7 parts of ammonium persulfate were added in the course of 2 hours. The mixture was maintained further at 80° C. for 8 hours, during which 3 parts in total of ammonium persulfate was added. There was thus obtained a milky white resin dispersion having a non-volatile content of 49.0% and a viscosity of 450 cps.

EXAMPLE 3

A water-soluble polymer solution B was obtained by following the procedures of Example 1 for the production of the water-soluble polymer solution A except that the same amount of 2-hydroxyethyl acrylate was used in place of 490 parts of 2-hydroxyethyl methacrylate. The resulting water-soluble polymer had a number average molecular weight of 6,800 and a water tolerance of greater than 1,000%.

A similar reactor was charged with 400 parts of the water-soluble polymer solution B and 800 parts of water, and heated to 80° C., to which 360 parts of methyl methacrylate, 350 parts of ethyl acrylate, 80 parts of 2-hydroxyethyl methacrylate, 10 parts of acrylic acid and 8 parts of benzoyl peroxide were added in the course of 2 hours, and further maintained at 80° C. for 4 hours. There was thus obtained a milky white resin dispersion having a non-volatile content of 50.6% and a viscosity of 650 cps.

EXAMPLE 4

The same reactor as used in Example 1 was charged with 900 parts of water, 60 parts of diethyleneglycol monoacrylate, 40 parts of 2-hydroxyethyl acrylate and 1 part of ammonium persulfate, heated at 70° C. and maintained at that temperature for about 3 hours. Thereafter, a part of the water was removed by distillation to give a water-soluble polymer solution C having a non-volatile content of 25%. The water-soluble polymer had a number average molecular weight of 6,400 and a water tolerance of greater than 1,000%.

A reactor the same as above was charged with 1,200 parts of the water-soluble polymer solution C and heated to 80° C., to which 315 parts of methyl methacrylate, 315 parts of ethyl acrylate, 70 parts of 2-hydroxyethyl methacrylate, 100 parts of water and 7 parts of ammonium persulfate were added in the course of 2 hours, and maintained at 80° C. for further 4 hours. There was thus obtained a milky white resin dispersion having a non-volatile content of 50.5% and a viscosity of 200 cps.

EXAMPLE 5

A reactor the same as used in Example 1 was charged with 900 parts of water, 49 parts of polyethyleneglycol monomethacrylate (added with 4.5 mols on an average of ethylene oxide), 49 parts of 2-hydroxyethyl acrylate, 2 parts of acrylic acid and 1 part of ammonium persulfate, heated to 70° C. and maintained at that temperature for about 3 hours. Thereafter, a part of the water was removed by distillation to give a water-soluble polymer solution D having a non-volatile content of 25%. The water-soluble polymer had a number average molecular weight of 9,500 and a water tolerance of greater than 1,000%.

A reactor the same as used above was charged with 800 parts of the water-soluble polymer solution D, 2 parts of glycidyl methacrylate, 0.2 part of triethylamine and 0.2 part of hydroquinone, heated to 110° C. and maintained at that temperature for about 8 hours. Next, 200 parts of water was added to lower the temperature to 80° C., to which 360 parts of methyl methacrylate, 360 parts of ethyl acrylate, 80 parts of 2-hydroxyethyl methacrylate, 200 parts of water and 8 parts of ammonium persulfate were added in the course of 2 hours, and maintained at 80° C. for further 4 hours. There was thus obtained a milky white resin dispersion having a non-volatile content of 50.5% and a viscosity of 300 cps.

COMPARATIVE EXAMPLE

This example illustrates that a high solid resin dispersion composition can not be obtained in accordance with the conventional process.

A reactor the same as used in Example 1 was charged with 900 parts of water, 100 parts of 2-hydroxyethyl acrylate and 1 part of ammonium persulfate, heated to 70° C. and maintained at that temperature for about three hours. Thereafter, a part of the water was removed by distillation to give a water-soluble polymer solution F having a non-volatile content of 25%.

A reactor the same as used above was charged with 1,200 parts of the water-soluble polymer solution F and heated to 80° C., to which 315 parts of methyl methacrylate, 315 parts of ethyl acrylate, 70 parts of 2-hydroxyethyl methacrylate, 100 parts of water and 7 parts of ammonium persulfate were added in the course of 2 hours whereby the resulting particle caused coagulation and precipitation, and the further continuation of the reaction became difficult. Hence, the reaction was terminated.

REFERENTIAL EXAMPLE 1

Storage stability, centrifugal stability and water-dilutability of the resin dispersion obtained in each of the abovementioned Examples were tested with the results illustrated in Table 1 below.

Table 1

| Item | Example 1 | Example 2 | Example 3 | Example 4 | Example 5 |
| --- | --- | --- | --- | --- | --- |
| Storage stability (left standing at room temp. for 3months) | No abnormality | No abnormality | No abnormality | No abnormality | No abnormality |
| Centrifugal stability (at 6,000 r.p.m. for 8 hours) | " | " | " | " | " |
| Water-dilutability (100 parts of dispersion was diluted with same amount of water) | " | " | " | " | " |

REFERENTIAL EXAMPLE 2

A methylated melamine resin solution (non-volatile content of 50%) as a curing agent was blended with the resin dispersion obtained in each of the above-mentioned Examples in a ratio of the solid content of 75/25 to form a coating composition, and the resulting composition was coated in a thickness of 6 mils onto a steel plate treated with zinc phosphate, and baked at 140° C. for 30 minutes. Properties of each of the resulting cured coatings are illustrated in Table 2 below.

Table 2

| Item | Example 1 | Example 2 | Example 3 | Example 4 | Example 5 |
| --- | --- | --- | --- | --- | --- |
| Pencil hardness | 2H | H–2H | H–2H | H–2H | H–2H |
| Brightness | Excellent | Excellent | Excellent | Excellent | Excellent |
| Impact resistance (cm) | 30–40 | 40–50 | >50 | 30–40 | >50 |
| Bending (mm) | 6 | 6 | 6 | 6 | 6 |
| Erichsen (mm) | 6.5 | >7 | >7 | >7 | >7 |
| Boiling water resistance | Excellent | Excellent | Excellent | Good | Excellent |
| Water resistance | " | " | " | " | " |
| Xylene rubbing | " | " | " | Excellent | " |
| Salt spray resistance (mm) | 1 | 1 | 1 | 2 | 1.5 |
| Stain resistance | Excellent | Excellent | Excellent | Good | Good |

Table 2-continued

| Item | Example 1 | Example 2 | Example 3 | Example 4 | Example 5 |
|---|---|---|---|---|---|
| Acid resistance | " | " | " | Excellent | Excellent |

The properties of the coatings illustrated in Table 2 were measured in the following manner, respectively.

Pencil hardness

Pencils of various hardnesses were prepared, and the core of each pencil was sharpened so that the tip of the core was flat and the corners were sharp. The coated surface was rubbed with each of the pencils at a load of 1 kg at an angle of 45° to the coated surface. The hardness of a pencil which was the softest among those which injured the coated surface was recorded.

Brightness

Observed visually.

Impact resistance

A steel ball, ¼ inch in diameter, was placed on the coating, and a load weighing 500 g was dropped onto the steel ball from various heights. The drop height of the load at a time when the coating peeled off from the substrate was measured.

Bending

A round steel rod with varying diameters was contacted with the back surface of a coated steel panel, and the steel panel was bended along the periphery of the steel rod. By this procedure, the crack resistance of the coating was measured. The test was carried out while varying the round steel rod from one having a diameter of 10 mm to one having a diameter of 8 mm, 6 mm, 4 mm and 2 mm respectively in decreasing order. The crack resistance was expressed by the diameter of a round steel rod that had the smallest diameter among those rods which did not cause cracking of the coating at the time of bending.

Erichsen

An 0.8 mm-thick mild rolled steel panel coated with the resin composition on one surface was fixed, and pushed from the side of the uncoated surface at a speed of 0.1 mm/second by means of a 20 mm-diameter punch in a direction at right angle to the surface until cracks occurred in the coating. The distance over which the steel panel was pushed during this time was measured.

Boiling water resistance

The sample was dipped in boiling water for 2 hours, and the state of the coated surface was observed.

Water resistance

The sample was dipped in warm water at 40° C. for 120 hours, and the state of the coated surface was observed.

Xylene rubbing

The coating surface of a sample was strongly rubbed with an adsorbent cotton soaked with xylene until the coating was peeled off. The number of rubbing cycles required until then was measured.

Salt spray resistance

The coated surface of the sample was cut in an X-shape, and 5% salt water was sprayed to the coated surface at 35° C. for 96 hours (72 hours in the case of Tables 1 and 5). Then, a Cellophane tape was adhered to the cut portion, and then peeled off from it. The peel width of the coating was measured.

Stain resistance

An oily ink was adhered to the coated surface, and then wiped off with a cloth. The degree of soiling of the coated surface was then observed visually.

Acid resistance

The sample was dipped in 10% $H_2SO_4$ at 25° C. for 24 hours, and the state of the coated surface was observed.

What is claimed is:

1. A process for producing a resin dispersion comprising polymerizing an ethylenically unsaturated monomer capable of forming a polymer insoluble in an aqueous medium in a solution formed by dissolving in an aqueous medium a water-soluble polymer derived from, based on the total monomers (1), (2) and (3),
   (1) 10–90% by weight of a hydroxyalkyl acrylate or methacrylate expressed by the following general formula

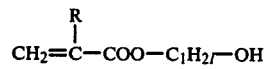
$$CH_2=\overset{R}{\underset{|}{C}}-COO-C_lH_{2l}-OH$$

wherein R is a hydrogen atom or a methyl group, and l is an integer of 2, 3 or 4,
   (2) 10–90% by weight of a polyalkyleneglycol monoacrylate or monomethacrylate expressed by the following general formula

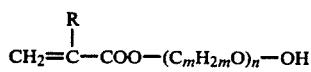
$$CH_2=\overset{R}{\underset{|}{C}}-COO-(C_mH_{2m}O)_n-OH$$

wherein R is a hydrogen atom or a methyl group, m is an integer of 2 or 3, and n is an integer of 2 to 20, and
   (3) 0–30% by weight of another ethylenically unsaturated monomer.

2. The process of claim 1 wherein the water-soluble polymer has a number average molecular weight as measured by gel permeation chromatography of from 1,000 to 100,000.

3. The process of claim 1 wherein the hydroxyalkyl acrylate or methacrylate (1) is selected from the group consisting of 2-hydroxyethyl acrylate, 2-hydroxyethyl methacrylate, 2-hydroxypropyl acrylate, 2-hydroxypropyl methacrylate, 2-hydroxy-n-butyl acrylate and 2-hydroxy-n-butyl methacrylate.

4. The process of claim 1 wherein the polyalkylene glycol monoacrylate or methacrylate (2) is selected from the group consisting of diethylene glycol monoacrylate, diethylene glycol monomethacrylate, triethylene glycol monoacrylate, triethylene glycol monomethacrylate, pentaethylene glycol monoacrylate, pentaethylene glycol monomethacrylate, dipropylene glycol monoacrylate, dipropylene glycol monomethacrylate, tripropylene glycol monoacrylate, tripropylene glycol monomethacrylate, pentapropylene glycol monoacrylate and pentapropylene glycol monomethacrylate.

5. The process of claim 1 wherein the ethylenically unsaturated monomer (3) is a monoene selected from the group consisting of methyl acrylate, methyl methacrylate, ethyl acrylate, ethyl methacrylate, propyl acrylate, propyl methacrylate, butyl acrylate, butyl methacrylate, diethyl maleate, dibutyl fumarate, diethyl itaconate, styrene, vinyl toluene, acrylamide, methacrylamide, N-methylol acrylamide, N-methylol methacrylamide, glycidyl acrylate, glycidyl methacrylate, acrylic acid, methacrylic acid, maleic acid, fumaric acid and itaconic acid.

6. The process of claim 1 wherein the ethylenically unsaturated monomer (3) is a polyene selected from the group consisting of an ester formed between 1 mole of a polymerizable carboxylic acid and 1 mole of glycidyl acrylate or gycidyl methacrylate, an ester of 1 mole of a polyhydric alcohol and at least 2 moles of acrylic acid or methacrylic acid, an adduct of at least 2 moles of a hydroxy alkyl acrylate or hydroxy alkyl methacrylate and 1 mole of a polyisocyanate, butadiene and isoprene.

7. The process of claim 1 wherein the water-soluble polymer is derived from, based on the total monomers (1), (2), and (3), (1) 30–70% by weight of the hydroxy alkyl acrylate or methacrylate; (2) 30–70% by weight of the polyalkylene glycol monoacrylate or methacrylate; and (3) up to 20% by weight of the other ethylenically unsaturated monomer.

8. The process of claim 1 wherein the hydroxyalkyl acrylate or methacrylate is 2-hydroxy ethyl acrylate or 2-hydroxy ethyl methacrylate; the polyalkylene glycol monoacrylate or methacrylate is a polyethylene glycol monoacrylate or methacrylate selected from the group consisting of diethylene glycol monoacrylate, diethylene glycol monomethacrylate, triethylene glycol monoacrylate, triethylene glycol monomethacrylate, pentaethylene glycol monoacrylate and pentaethylene glycol monomethacrylate; and the other ethylenically unsaturated monomer is at least 1 polyene which is an ester formed by the reaction between 1 mole of a polymerizable carboxylic acid selected from the group consisting of acrylic acid and methacrylic acid with 1 mole of glycidyl acrylate or glycidyl methacrylate, said polyene being used in an amount of from 0.05 to 15% by weight based on the total monomers in the water-soluble polymer.

9. The process of claim 1 wherein the aqueous medium in which the polymerization is carried out is water.

10. The process of claim 1 wherein the aqueous medium in which the polymerization is carried out is a blend of water and a water-soluble organic solvent consisting of 100 parts by weight of water and up to 400 parts by weight of the water-soluble organic solvent.

11. The process of claim 1 wherein the solid content of the resin dispersion is from 40–60% by weight.

12. The process of claim 1 wherein the ethylenically unsaturated monomer capable of forming a polymer insoluble in an aqueous medium is a combination of (i) a monomer not having a functional group selected from the group consisting of methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, benzyl acrylate, benzyl methacrylate, cyclohexyl acrylate, cyclohexyl methacrylate, diethyl maleate, dibutyl maleate, diethyl fumarate, dibutyl fumarate, diethyl itaconate, dibutyl itaconate, methacrylonitrile, vinyl acetate, vinyl toluene, α-methylstyrene, and (ii) a monomer having a functional group selected from the group consisting of 2-hydroxyethyl acrylate, 2-hydroxyethyl methacrylate, 2-hydroxypropyl acrylate, 2-hydroxypropyl methacrylate, N-methylol methacrylamide, glycidyl acrylate, glycidyl methacrylate, acrylic acid, methacrylic acid, maleic acid, fumaric acid and itaconic acid.

* * * * *